(12) United States Patent
Konecky

(10) Patent No.: US 9,875,536 B2
(45) Date of Patent: Jan. 23, 2018

(54) SUB-PIXEL AND SUB-RESOLUTION LOCALIZATION OF DEFECTS ON PATTERNED WAFERS

(71) Applicant: KLA-Tencor Corporation, Milpitas, CA (US)

(72) Inventor: Soren Konecky, Alameda, CA (US)

(73) Assignee: KLA-Tencor Corp., Milpitas, CA (US)

( * ) Notice: Subject to any disclaimer, the term of this patent is extended or adjusted under 35 U.S.C. 154(b) by 4 days.

(21) Appl. No.: 15/084,340

(22) Filed: Mar. 29, 2016

(65) Prior Publication Data

US 2016/0292840 A1    Oct. 6, 2016

Related U.S. Application Data

(60) Provisional application No. 62/140,897, filed on Mar. 31, 2015.

(51) Int. Cl.
*G06K 9/00* (2006.01)
*G06T 7/00* (2017.01)

(52) U.S. Cl.
CPC .... *G06T 7/001* (2013.01); *G06T 2207/10061* (2013.01); *G06T 2207/30148* (2013.01)

(58) Field of Classification Search
CPC ........... G06T 7/001; G06T 2207/10061; G06T 2207/30148
USPC ........................................................ 382/149
See application file for complete search history.

(56) References Cited

U.S. PATENT DOCUMENTS

| | | | |
|---|---|---|---|
| 7,570,796 | B2 | 8/2009 | Zafar et al. |
| 7,676,077 | B2 | 3/2010 | Kulkarni et al. |
| 8,126,255 | B2 | 2/2012 | Bhaskar et al. |
| 8,664,594 | B1 | 4/2014 | Jiang et al. |
| 8,692,204 | B2 | 4/2014 | Kojima et al. |
| 8,698,093 | B1 | 4/2014 | Gubbens et al. |
| 8,716,662 | B1 | 5/2014 | MacDonald et al. |
| 9,222,895 | B2 | 12/2015 | Duffy et al. |

(Continued)

FOREIGN PATENT DOCUMENTS

| | | |
|---|---|---|
| JP | 2005-217060 | 8/2005 |
| JP | 2011-002280 | 1/2011 |
| WO | 2007/120279 | 10/2007 |

OTHER PUBLICATIONS

International Search Report for PCT/US2016/025371 dated Jun. 27, 2016.

(Continued)

*Primary Examiner* — Jerome Grant, II
(74) *Attorney, Agent, or Firm* — Ann Marie Mewherter

(57) ABSTRACT

Methods and systems for determining if a defect detected on a specimen is a DOI (Defect of Interest) or a nuisance are provided. One system includes computer subsystem(s) configured for aligning output of an inspection subsystem for an area on a specimen to simulated output of the inspection subsystem for the area on the specimen and detecting a defect in the output for the area on the specimen. The computer subsystem(s) are also configured for determining a location of the defect in the output with respect to patterned features in the simulated output based on results of the detecting and aligning, determining a distance between the determined location of the defect and a known location of interest on the specimen, and determining if the defect is a DOI or a nuisance based on the determined distance.

45 Claims, 4 Drawing Sheets

(56) References Cited

U.S. PATENT DOCUMENTS

| | | | |
|---|---|---|---|
| 2003/0010905 A1* | 1/2003 | Luo | G01J 1/04 |
| | | | 250/227.11 |
| 2007/0008518 A1* | 1/2007 | Hummel | G01N 21/6489 |
| | | | 356/237.1 |
| 2009/0207244 A1* | 8/2009 | Redko | G01N 21/894 |
| | | | 348/88 |
| 2011/0187848 A1 | 8/2011 | Choi et al. | |
| 2014/0282334 A1 | 9/2014 | Hu et al. | |
| 2016/0019682 A1* | 1/2016 | Takagi | H01L 22/12 |
| | | | 382/149 |
| 2016/0372303 A1* | 12/2016 | Park | H01J 37/222 |
| 2017/0047195 A1* | 2/2017 | Lee | H01J 37/222 |
| 2017/0067833 A1* | 3/2017 | Lee | G01N 21/88 |
| 2017/0102609 A1* | 4/2017 | Ren | G03F 1/50 |

OTHER PUBLICATIONS

Written Opinion for PCT/US2016/025371 dated Jun. 27, 2016.
Betzig et al., "Imaging Intracellular Fluorescent Proteins at Nanometer Resolution," Science, vol. 313, Sep. 15, 2006, pp. 1642-1645.
Yildiz et al., "Myosin V Hand-Over-Hand: Single Fluorophore Imaging with 1.5-nm Localization," Science, vol. 300 (2003), pp. 2061-2065.

* cited by examiner

SUB-PIXEL AND SUB-RESOLUTION LOCALIZATION OF DEFECTS ON PATTERNED WAFERS

BACKGROUND OF THE INVENTION

1. Field of the Invention

This invention generally relates to methods and systems for determining if a defect detected on a specimen is a defect of interest or a nuisance. Some embodiments include determining a sub-pixel location of a defect detected on a specimen and determining if the defect is a defect of interest or a nuisance based on that location.

2. Description of the Related Art

The following description and examples are not admitted to be prior art by virtue of their inclusion in this section.

An integrated circuit (IC) design may be developed using a method or system such as electronic design automation (EDA), computer aided design (CAD), and other IC design software. Such methods and systems may be used to generate the circuit pattern database from the IC design. The circuit pattern database includes data representing a plurality of layouts for various layers of the IC. Data in the circuit pattern database may be used to determine layouts for a plurality of reticles. A layout of a reticle generally includes a plurality of polygons that define features in a pattern on the reticle. Each reticle is used to fabricate one of the various layers of the IC. The layers of the IC may include, for example, a junction pattern in a semiconductor substrate, a gate dielectric pattern, a gate electrode pattern, a contact pattern in an interlevel dielectric, and an interconnect pattern on a metallization layer.

The term "design data" as used herein generally refers to the physical design (layout) of an IC and data derived from the physical design through complex simulation or simple geometric and Boolean operations.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail.

As design rules shrink, however, semiconductor manufacturing processes may be operating closer to the limitations on the performance capability of the processes. In addition, smaller defects can have an impact on the electrical parameters of the device as the design rules shrink, which drives more sensitive inspections. Therefore, as design rules shrink, the population of potentially yield relevant defects detected by inspection grows dramatically, and the population of nuisance defects detected by inspection also increases dramatically. Therefore, more and more defects may be detected on the wafers, and correcting the processes to eliminate all of the defects may be difficult and expensive.

There are several currently used methods designed to decrease nuisance detection by either limiting the area scanned or by using only image data from selected areas. Examples of such methods include design-based care areas (CAs), methods that perform pixel to design alignment (PDA), and patch-based detection. Design-based CAs can be used to limit the area of inspection by either using design files to generate relatively small (but still multi-pixel) CAs or by looking for locations whose optical images look similar to optical images acquired at known hot spots and inspecting only those areas. Methods that perform PDA use design information to determine registration sites on the wafer. These locations can then be found in the optical image and used to determine the relative location of DOI in the optical images and thus the location of the DOI within the design. In patch-based detection, a projection of the optical image may be made. The projection allows the image to be segmented in one dimension into regions in which the DOI is expected and where it does not occur. The primary application of patch-based detection is to separate signals originating from N-type metal-oxide-semiconductor (NMOS) and P-type metal-oxide-semiconductor (PMOS) regions in static random access memory (SRAM).

While the currently used methods have been proven effective for a number of uses, these methods do have some limitations. For example, the above-described methods are limited by the size and uncertainty in location of the region they can define. In one such example, even methods that perform PDA and patch-based detection, which define relatively small regions, still define multi-pixel regions. The smallest regions being attempted by methods that perform PDA are 3×3 pixels, and the uncertainty in the positioning of the regions is believed to be at least +/−1 pixel if not more. Patch-based detection only segments the image along one dimension. In addition, one cannot control how the pixels align with the wafer structure during a scan requiring regions at least 2 pixels wide for a total area of at least 64 pixels for a 32×32 pixel optical patch image. In another example, methods that define care areas for inspection can typically only define a limited number of areas. Furthermore, patch-based detection is vulnerable to changes in the appearance of reference images that can occur due to sources such as wafer process variation and changes in focus offset. Information is lost when the projection of the patch image is made, and it is difficult to deal with multiple types of images, since their projections may be very similar but translated in space. Methods that perform PDA can also be sensitive to differences between the design file and the actual wafer. These differences can be magnified when the DOI locations are relatively far from the registration sites. Moreover, patch-based detection is (to date) only one dimensional. In addition, patch-based detection only works in memory areas.

Accordingly, it would be advantageous to develop systems and/or methods for determining if a defect detected on a specimen is a DOI or a nuisance that do not have one or more of the disadvantages described above.

SUMMARY OF THE INVENTION

The following description of various embodiments is not to be construed in any way as limiting the subject matter of the appended claims.

One embodiment relates to a system configured to determine if a defect detected on a specimen is a defect of interest (DOI) or a nuisance. The system includes an inspection subsystem that includes at least an energy source and a detector. The energy source is configured to generate energy that is directed to a specimen. The detector is configured to detect energy from the specimen and to generate output responsive to the detected energy.

The system also includes one or more computer subsystems configured for aligning the output of the inspection subsystem for an area on the specimen to simulated output of the inspection subsystem for the area on the specimen. The computer subsystem(s) are also configured for detecting a defect in the output for the area on the specimen and determining a location of the defect in the output with respect to patterned features in the simulated output based on results of the detecting and the aligning. In addition, the computer subsystem(s) are configured for determining a distance between the determined location of the defect and a known location of interest on the specimen and determining if the defect is a DOI or a nuisance based on the determined distance. The system may be further configured as described herein.

Another embodiment relates to a computer-implemented method for determining if a defect detected on a specimen is a DOI or a nuisance. The method includes steps for each of the functions of the one or more computer subsystems described above. The steps of the method are performed by one or more computer systems. The method may be performed as described further herein. In addition, the method may include any other step(s) of any other method(s) described herein. Furthermore, the method may be performed by any of the systems described herein.

An additional embodiment relates to a non-transitory computer-readable medium storing program instructions executable on a computer system for performing a computer-implemented method for determining if a defect detected on a specimen is a DOI or a nuisance. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Other objects and advantages of the invention will become apparent upon reading the following detailed description and upon reference to the accompanying drawings in which.

Figure 1:
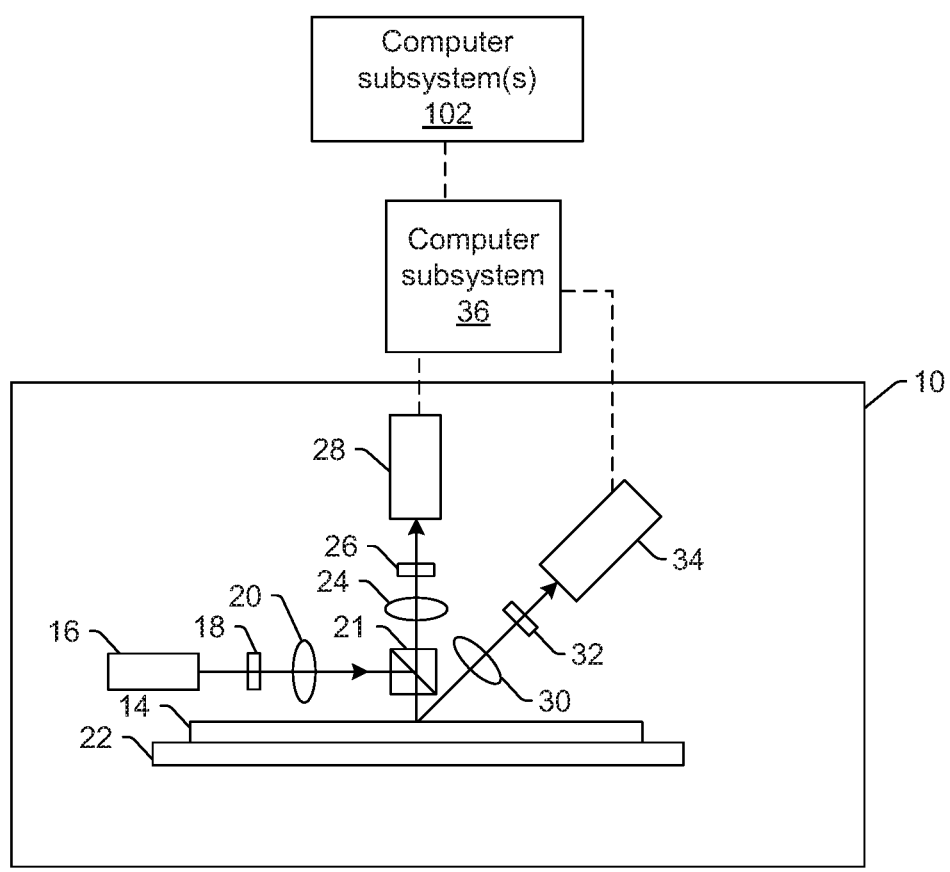
FIGS. 1 and 2 are schematic diagrams illustrating side views of embodiments of a system configured as described herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design" and "design data" as used herein generally refer to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In general, however, the design information or data cannot be generated by imaging a wafer with a wafer inspection system. For example, the design patterns formed on the wafer may not accurately represent the design for the wafer and the wafer inspection system may not be capable of generating images of the design patterns formed on the wafer with sufficient resolution such that the images could be used to determine information about the design for the wafer. Therefore, in general, the design information or design data cannot be generated using a physical wafer. In addition, the "design" and "design data" described herein refers to information and data that is generated by a semiconductor device designer in a design process and is therefore available for use in the embodiments described herein well in advance of printing of the design on any physical wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to determine if a defect detected on a specimen is a defect of interest (DOI) or a nuisance. In general, the embodiments described herein are configured for localization of defects on patterned wafers and other patterned specimens that is both sub-pixel and sub-resolution, and which is useful for determining if a defect is a DOI or a nuisance. "Sub-pixel" as that term is used herein is generally defined as smaller than a pixel of output generated by an inspection subsystem. In this manner, "sub-pixel localization" as that term is used herein can be generally defined as the determination of the position of something (e.g. a defect) with an error smaller than the size (distance from one side to the other) of a single pixel in the image acquired by the imaging device. "Sub-resolution" as that term is used herein is generally defined as smaller than a resolution limit of an inspection subsystem. As such, "sub-resolution localization" as that term is used herein can be generally defined as the determination of the position of something (e.g. a defect) with an error smaller than the resolution limit of the imaging device.

In addition to the advantages of the embodiments described further herein, the embodiments described herein are important for a number of reasons. For example, improvements in the sensitivity of inspection (e.g., optical inspection) can be achieved either by increasing the signal from defects or by decreasing the amount of nuisance detected. The embodiments described herein concentrate on decreasing nuisance.

Many times, which defects users consider being DOI has more to do with the part of their process they are currently interested in rather than the actual amount of variation on the specimen. Thus, events classified as nuisance may have stronger signals than signals from DOI. In addition, defects are becoming increasingly small compared to the point spread function (PSF) of optical inspection tools. This means that the shapes of DOI and nuisance signals are primarily determined by the optical mode and not their own characteristics. As a result, it is increasingly difficult to use features of the DOI signal to distinguish it from the nuisance signal. Thus, methods that rely on the location of DOI are becoming increasingly important.

The embodiments described herein are, therefore, extremely valuable because they greatly increase the ability to exclude nuisance based on location. It is expected that the amount of detected nuisance scales linearly with the detection area. Other currently used methods may only have the potential to localize DOI to within an area consisting of 10s of pixels. In contrast, as described further herein, the embodiments are expected to reduce that area to less than a tenth of a pixel. Such capability provides the potential for greater than 100× improvement in nuisance reduction compared to other known methods.

In one embodiment, the specimen includes a wafer. In another embodiment, the specimen includes a reticle. The wafer and the reticle may include any wafer and reticle known in the art.

One embodiment of such a system is shown in FIG. 1. The system includes an inspection subsystem that includes at least an energy source and a detector. The energy source is configured to generate energy that is directed to a specimen. The detector is configured to detect energy from the specimen and to generate output responsive to the detected energy.

In one embodiment, the energy directed to the specimen includes light, and the energy detected from the specimen includes light. For example, in the embodiment of the system shown in FIG. 1, inspection subsystem 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to beam splitter 21, which directs the light to specimen 14 at a normal angle of incidence. The angle of incidence may include any suitable angle of incidence, which may vary depending on, for instance, characteristics of the specimen and the defects to be detected on the specimen.

The illumination subsystem may be configured to direct the light to the specimen at different angles of incidence at different times. For example, the inspection subsystem may be configured to alter one or more characteristics of one or more elements of the illumination subsystem such that the light can be directed to the specimen at an angle of incidence that is different than that shown in FIG. 1. In one such example, the inspection subsystem may be configured to move light source 16, optical element 18, and lens 20 such that the light is directed to the specimen at a different angle of incidence.

In some instances, the inspection subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for inspection.

The inspection subsystem may also include a scanning subsystem configured to cause the light to be scanned over the specimen. For example, the inspection subsystem may include stage 22 on which specimen 14 is disposed during inspection. The scanning subsystem may include any suitable mechanical and/or robotic assembly (that includes stage 22) that can be configured to move the specimen such that the light can be scanned over the specimen. In addition, or alternatively, the inspection subsystem may be configured such that one or more optical elements of the inspection subsystem perform some scanning of the light over the specimen. The light may be scanned over the specimen in any suitable fashion.

The inspection subsystem further includes one or more detection channels. At least one of the one or more detection channels includes a detector configured to detect light from the specimen due to illumination of the specimen by the inspection subsystem and to generate output responsive to the detected light. For example, the inspection subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the specimen. However, two or more of the detection channels may be configured to detect the same type of light from the specimen (e.g., specularly reflected light). Although FIG. 1 shows an embodiment of the inspection subsystem that includes two detection channels, the inspection subsystem may include a different number of detection channels (e.g., only one detection channel or two or more detection channels). Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), and time delay integration (TDI) cameras. The detectors may also include any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the inspection subsystem may be signals or data, but not image signals or image data. In such instances, a computer subsystem such as computer subsystem 36 of the system may be configured to generate images of the specimen from the non-imaging output of the detectors. However, in other instances, the detectors may be configured as imaging detectors that are configured to generate imaging signals or image data. Therefore, the system may be configured to generate the output described herein in a number of ways.

It is noted that FIG. 1 is provided herein to generally illustrate a configuration of an inspection subsystem that may be included in the system embodiments described herein. Obviously, the inspection subsystem configuration described herein may be altered to optimize the performance of the system as is normally performed when designing a commercial inspection system. In addition, the systems described herein may be implemented using an existing inspection system (e.g., by adding functionality described herein to an existing inspection system) such as the 28xx and 29xx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

Computer subsystem 36 of the system may be coupled to the detectors of the inspection subsystem in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions using the output of the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 (as shown by the dashed line in FIG. 1) by any suitable transmission media, which may include any suitable wired and/or wireless transmission media known in the art. Two or more of such computer subsystems may also be effectively coupled by a shared computer-readable storage medium (not shown).

Although the inspection subsystem is described above as being an optical or light-based inspection subsystem, the inspection subsystem may be an electron beam-based inspection subsystem. For example, in one embodiment, the energy directed to the specimen includes electrons, and the energy detected from the specimen includes electrons. In this manner, the energy source may be an electron beam source. In one such embodiment shown in FIG. 2, the inspection subsystem includes electron column 122, which is coupled to computer subsystem 124.

Figure 2:
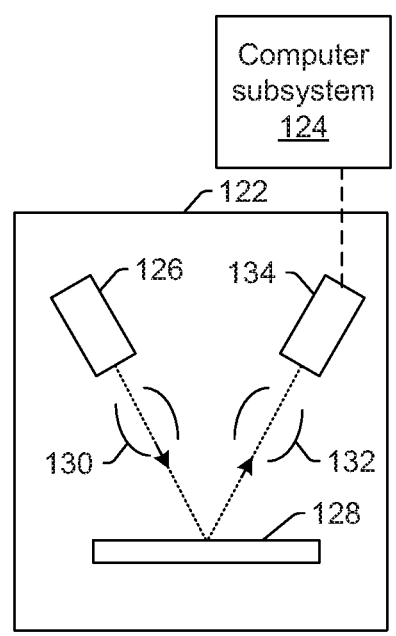

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam-based subsystem may be configured to use multiple modes to generate images of the specimen (e.g., with different illumination angles, collection angles, etc.). The multiple modes of the electron beam-based subsystem may be different in any image generation parameters of the subsystem.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform any of the functions described herein using the output of the detector and/or the electron beam images. Computer subsystem 124 may be configured to perform any additional step(s) described herein. A system that includes the inspection subsystem shown in FIG. 2 may be further configured as described herein.

It is noted that FIG. 2 is provided herein to generally illustrate a configuration of an electron beam-based inspection subsystem that may be included in the embodiments described herein. As with the optical inspection subsystem described above, the electron beam-based inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the eSxxx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

Although the inspection subsystem is described above as being a light-based or electron beam-based inspection subsystem, the inspection subsystem may be an ion beam-based inspection subsystem. Such an inspection subsystem may be configured as shown in FIG. 2 except that the electron beam source may be replaced with any suitable ion beam source known in the art. In addition, the inspection subsystem may be any other suitable ion beam-based subsystem such as those included in commercially available focused ion beam (FIB) systems, helium ion microscopy (HIM) systems, and secondary ion mass spectroscopy (SIMS) systems.

The one or more computer subsystems described above are configured for aligning the output of the inspection subsystem for an area on the specimen to simulated output of the inspection subsystem for the area on the specimen. For example, the alignment may be performed by aligning measured images to simulated images derived from a model. Aligning such output (e.g., images) to each other may be performed in a number of different manners. For example, in some embodiments, the aligning includes maximizing a cross-correlation between the output and the simulated output. For example, upon inspection, the measured images may be aligned to the simulated images by maximizing the cross-correlation between images. The cross-correlation that is used in the aligning may include any suitable cross-correlation known in the art such as a normalized cross-correlation. In another embodiment, the aligning performed by the computer subsystem(s) aligns the output to the simulated output with sub-pixel and/or sub-resolution accuracy. For example, aligning the images by maximizing the cross-correlation between images may result in the measured images being aligned to the model of the specimen structure with sub-pixel and/or sub-resolution accuracy.

In one embodiment, the computer subsystem(s) are configured for generating different models of the specimen for different areas on the specimen and generating the simulated output for the area by selecting one of the different models corresponding to the area and simulating how the area would appear in the output generated by the inspection subsystem for the area based on the selected one of the different models. For example, the computer subsystem(s) may be configured for generating model(s), as shown in step 300 of FIG. 3. The model(s) are description(s) of the specimen that can be used to produce a simulation result. For example, a model may define a structure such as a gate to be formed on the specimen with various information about the structure such as its location, size, etc. and its optical characteristics (e.g., that it would reflect a certain amount of light at a particular wavelength). In this manner, the model may be used to perform a simulation that outputs a simulated image.

A separate model may be generated for each area of the specimen in which one is interested (e.g., one model for each static random access memory (SRAM) region or for each pattern in logic where DOI are expected). In addition, before output acquisition, one or more numerical models of the specimen may be constructed. For example, the computer subsystem(s) may be configured to select the expected DOI locations. In this manner, the computer subsystem(s) may generate expected DOI locations 302. For inspections, the model includes the expected DOI locations within each pattern (e.g., N-type metal oxide semiconductor (NMOS) fins, contact holes, etc.). Therefore, the embodiments described herein are advantageous over currently used methods in that the embodiments described herein can be used for both logic and memory areas on the specimen.

The model(s) of the specimen may be created based on SEM or optical images or design information. For example, to date, these models have been based on information from SEM images. However, they could also be derived from a design file or in many cases be inferred from optical images of the specimen acquired by an inspection tool. Therefore, although design files could be used for generating the model(s), the design files are not necessary. For example, for many structures, a basic knowledge of the structure should be enough to create a model.

The computer subsystem(s) may also be configured for learning image rendering parameters from example images of the selected areas. For example, areas that have been selected as described further herein may be used for acquiring the design or model for each area, which may be performed in any suitable manner. The areas and the design or model acquired for each of the areas may then be used for learning image rendering parameters for example areas. Learning the image rendering parameters may be performed in any suitable manner (e.g., as in setting up and/or calibrating a simulation model or method). The example areas may be selected as described herein and/or may include a selection of representative samples from some portion of the die that covers various patterns, e.g., dense geometry, sparse geometry, etc.

Figure 3:
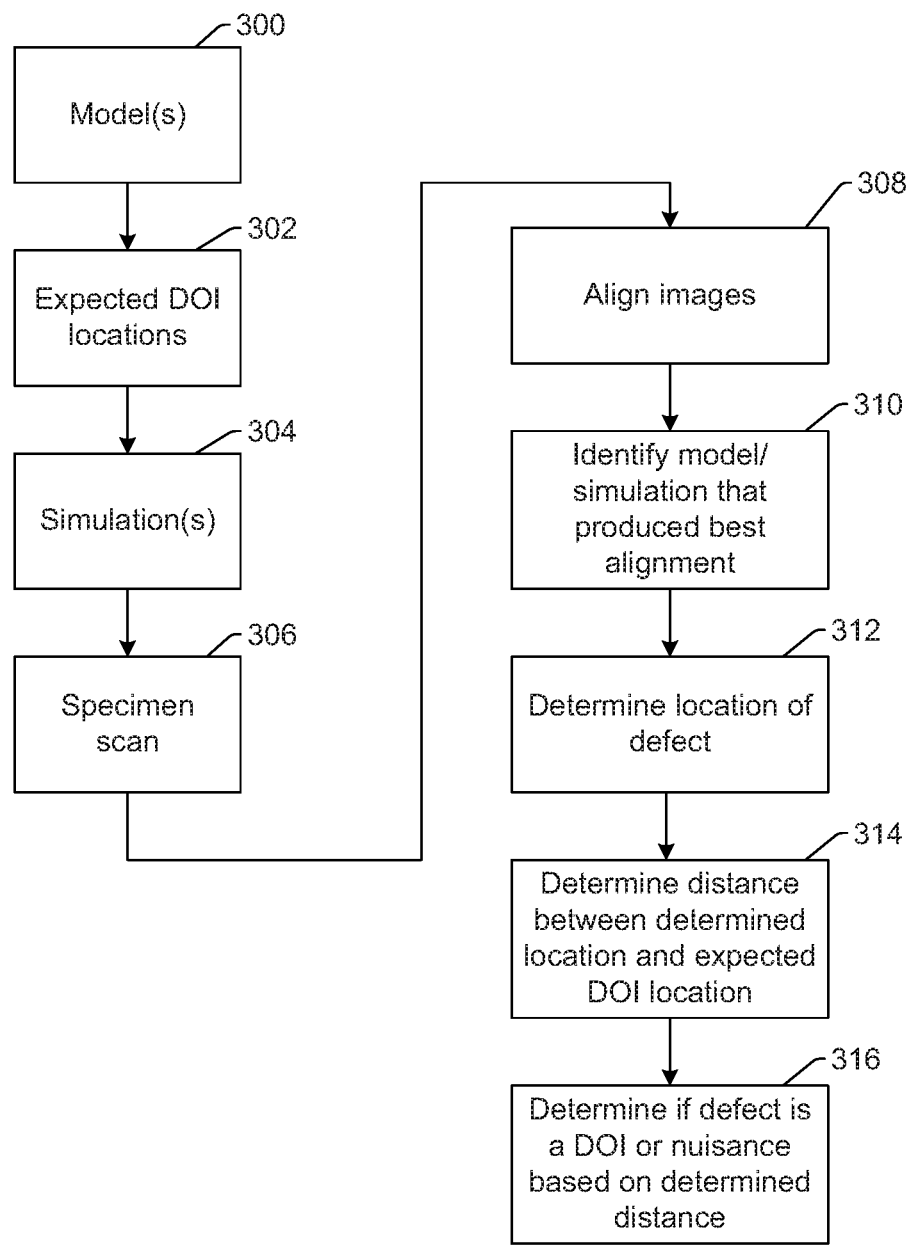
FIG. 3 is a flow diagram illustrating one embodiment of steps that may be performed by system embodiments described herein.

As shown in step 304 of FIG. 3, the computer subsystem(s) may perform simulation(s). For example, based on information about an area, the computer subsystem(s) may select one of the model(s) corresponding to the area. The computer subsystem(s) may then use the model(s) to simulate how the area would appear in the output generated by the inspection subsystem. In addition, the computer subsystem(s) may perform simulation(s) to generate simulated image(s), e.g., optical and/or electron beam images, for a specimen for a given mode or modes of the inspection subsystem (wherein a "mode" is defined generally as a set of parameters that govern output acquisition, e.g., optical or electron beam imaging). In this manner, a simulation based on each model may be performed, thereby creating simulated images of each area.

The computer subsystem(s) may therefore render image(s) for each area. The simulation results need not be quantitatively accurate in their grey levels. However, preferably the simulation results are capable of being highly correlated with the measured images. For example, as long as the output and the simulated output can be spatially correlated mathematically, the simulated output can otherwise have characteristics that are different from the output generated by the inspection subsystem. For example, the simulations may be performed using relatively simple two-dimensional models of the specimen and convolving them with a Gaussian or other PSF such as an airy disc to generate the simulated optical image.

However, more sophisticated simulations can be performed (e.g., rigorous wave coupled analysis (RCWA)), which may be more accurate and/or allow the invention to be used with a greater number of modes. To generate the most accurate simulated images, the simulation can involve the simulation of the electromagnetic (EM) field by solving Maxwell's equations from three-dimensional information for the chip design and material, followed by simulation of the optical (or electron beam) parameters of the inspection subsystem used to form an image of the specimen. In this manner, more complicated rendering can produce a more satisfactory result with alignment to the real image (e.g., optical or electron beam).

The simulation(s) described herein may be performed offline (not while a specimen is being scanned by the inspection subsystem). Due to the offline nature of the simulation(s), a better rendering algorithm and/or method (e.g., more complex and time consuming to perform) can be used for simulating the output that would be generated by the inspection subsystem for the area, which can provide simulated images that more closely match how the area will be printed on the specimen and imaged by the inspection subsystem thereby reducing match result variability due to inaccurate design rendering.

As shown in FIG. 3, the system may perform a scan (optical or electron beam) of the specimen, as shown in step 306. For example, the inspection subsystem may scan light or electron beam(s) across the specimen as described above as output is being generated by detector(s) of the inspection subsystem. The computer subsystem(s) may then acquire the output from the detector(s) as described further herein.

Although this step is shown as being performed after the simulation(s) in FIG. 3, it is to be understood that the specimen scan may be performed at any suitable point in time. For example, the specimen scan can be performed before any other step(s) described herein as long as the output can be stored in a suitable storage medium until it is needed for other step(s). One example of such a storage medium is a virtual inspector (VI), which can store massive amounts of output generated for a specimen such that the output can be "played back" in a manner that mimics real time acquisition of the output during which a virtual inspection can be performed for the specimen using only the stored output. Examples of such virtual inspectors are illustrated in U.S. Pat. No. 8,126,255 issued on Feb. 28, 2012 to Bhaskar et al. and U.S. Pat. No. 9,222,895 issued on Dec. 29, 2015 to Duffy et al., which are incorporated by reference as if fully set forth herein. The computer subsystem(s) described herein may be further configured as described in these patents. However, it may also be possible to perform many of the step(s) described herein before or during the scanning of the specimen. In this manner, the embodiments described herein may be configured to be performed in-line.

In some embodiments, the aligning includes performing multiple alignment steps in which the output for the area is separately aligned to multiple simulated output for the area, determining which of the multiple alignment steps produced the best alignment, and selecting results of the multiple alignment step determined to produce the best alignment as the results of the aligning used for determining the location of the defect. For example, as shown in FIG. 3, the computer subsystem(s) may be configured to align images, as shown in step 308, which may be performed as described further herein for each of the multiple alignment steps. In addition, the computer subsystem(s) may be configured for identifying the model and/or simulation that produced the best alignment, as shown in step 310 in FIG. 3. For example, if there is more than one model and/or simulation for an area, the model and/or simulation that produced simulated output having the highest correlation to the output (e.g., a reference patch image) may be chosen. The alignment results that were determined to be the best may then be used for additional step(s) described herein.

Such embodiments may be advantageous for a number of reasons. For example, the actual images may be caused to vary unintentionally (and possibly undesirably) due to process variations. If an actual scan of a specimen is known to produce varying images within a single area on the specimen, multiple simulations can be performed for that area. In addition, the actual images may be caused to vary intentionally (e.g., when different modes are used to generate the different images). Therefore, it may be advantageous to generate multiple simulated images for each area on the specimen for which step(s) described herein will be performed. The simulated image that correlates best with each measured image can be determined on the fly (i.e., while the step(s) are being performed by the computer subsystem(s)) and used for the localization. In this manner, the embodiments described herein may be substantially robust to image variation.

In a further embodiment, the output used for the aligning includes a reference image for the area, the output for the area also includes a target image, and the computer subsystem(s) are configured for aligning the target image for the area to the reference image thereby aligning the target image to the simulated output. For example, during a scan of a specimen, target and reference "patch" images for each location may be saved, where "patch" images (also commonly called image "patches") can be generally defined as relatively small images acquired at specific locations on a specimen. The target and reference image patches may be acquired at different locations on the specimen at which the same or substantially the same patterned features are intended to be formed. For example, the target and reference patch images may be acquired at different locations of the same features, and the different locations may be in the same die or at the same die positions within different dies. The target "patch image" may be aligned to the simulated images for this implementation. In this manner, the reference patch image(s) may be aligned to the simulated image(s). The computer subsystem(s) may also align the target and reference output (or images) as may normally be performed during an inspection. Therefore, by aligning the reference patch image(s) to the simulated image(s), the target image(s) are effectively aligned to the simulated image(s). Such embodiments of the system have a number of advantages. For example, all alignment can be performed locally over relatively small optical patches. Therefore, the embodiments described herein are not sensitive to differences between the model and the specimen, which can accumulate over relatively large distances.

The computer subsystem(s) are also configured for detecting a defect in the output for the area on the specimen. Detecting defects on the specimen may be performed in any suitable manner known in the art (e.g., applying a threshold to the output and determining that any output having a value above the threshold corresponds to a defect or a potential defect) with any suitable defect detection method and/or algorithm. The "defects" that are detected in the output may be more accurately referred to as "events" or "potential defects" that are possibly defects but also possibly not defects. For example, the "defects" that are detected in the output by the computer subsystem(s) may be determined as described further herein to be either DOIs or nuisances.

In another embodiment, the output for the area includes reference output and target output for the area, and detecting the defect includes generating a difference image for the area by subtracting the reference output for the area from the target output for the area and applying a defect detection method to the difference image. The reference and target output may be acquired as described further herein. Generating the difference image may include aligning the reference and target output and then subtracting the reference output from the target output, which may be performed in any suitable manner. The defect detection method may be applied to the difference image as described further herein.

In one embodiment, the output for the area includes reference output and target output for the area, and detecting the defect includes generating a difference image for the area by subtracting the reference output for the area from the target output for the area and detecting the defect in the difference image by applying a threshold to the difference image, and the threshold is a hot threshold. For example, a "hot scan" may be performed in which a substantial number (e.g., ~100K) of candidate locations are selected, and target and reference "patch" images for each location may be saved. A "hot" threshold can be generally defined as a threshold that is at, within, or substantially near the noise floor of the output generated by the inspection subsystem for the specimen. In this manner, the defect detection can be quite a bit more aggressive (hotter) than would normally be performed for a tuned inspection recipe, so that more events, including defects and nuisance events, are detected than desired in a tuned inspection. In this manner, such an inspection would not normally be useful for production monitoring due to the substantially high nuisance event detection. Such an inspection is commonly referred to as a "hot" inspection. The reference and target output may be acquired as described further herein. Generating the difference image may be performed as described further herein. The threshold may be applied to the difference image as described further herein.

The computer subsystem(s) are further configured for determining a location of the defect in the output with respect to patterned features in the simulated output based on results of the detecting and the aligning. For example, as shown in step 312 of FIG. 3, the computer subsystem(s) may be configured for determining the location of a defect. Since the output (e.g., optical images) are aligned to the simulated output as described herein, once a defect is detected, the location of the potential DOI with respect to the simulated output is known. In this manner, once the location of the defect is known with respect to the simulated output, the location of the defect is known with respect to patterned features formed proximate to the defect in the simulated output (and therefore with respect to the patterned features formed on the specimen and in the design).

In one such embodiment, determining the location of the defect is performed by fitting a portion of the difference image corresponding to the defect to a Gaussian function. For example, the measured signal in the difference image corresponding to a potential defect can be fitted to the expected signal profile (e.g., a Gaussian profile) for the DOI. In other words, the computer subsystem(s) may fit for the DOI location using a Gaussian model. For modes of the inspection subsystem and for DOI with irregular signal profiles, the DOI location could be determined by fitting to simulations of these signal profiles. In another embodiment, determining the location of the defect is performed by fitting a portion of the difference image corresponding to the defect to a function. For example, any appropriate function (including non-Gaussian functions) may be used to describe the defect profiles. In an additional embodiment, determining the location of the defect is performed by fitting a portion of the difference image corresponding to the defect to an Airy disc function. For example, functions that can be used to describe the defect profiles may include functions that can be described analytically (e.g., Airy discs or polynomials) or functions derived from measurements (e.g., a set of defects are measured and their profiles are averaged together). The model or function used for the expected signal profiles of the inspection subsystem may include any suitable such model or function known in the art having any suitable format known in the art. In addition, the fitting of the portion of the difference image to the model for the signal profiles may be performed in any suitable manner.

In another such embodiment, determining the location of the defect is performed by determining a centroid of the defect signal in the difference image. For example, instead of fitting a function to the defect signal, the centroid of the defect signal may be calculated and used as the location of the defect. In another embodiment, a simulated image of the defect profile is shifted relative to the difference image until the cross-correlation between the images is maximized. In another embodiment, a simulated image of the defect profile is shifted relative to the difference image until the sum-squared difference between the two images is minimized. In a further embodiment, determining the location of the defect includes performing interpolation to upsample the difference image onto a grid of pixels that is finer than a grid of pixels in the output and using a location of a center of a pixel in the finer grid of pixels with the strongest signal as the location of the defect. These steps may be performed in any suitable manner known in the art.

In some embodiments, the location of the defect with respect to the patterned features is determined with sub-pixel and/or sub-resolution accuracy. In this manner, the embodiments described herein can determine the location of defects on patterned specimens (e.g., patterned wafers) with sub-pixel and/or sub-resolution accuracy. For example, the potential DOI location in each optical image (or other output) may be determined with sub-pixel and/or sub-resolution accuracy by fitting the measured signal to a Gaussian function. As such, the alignment of the output and the fitting for the defect location (using a Gaussian) can be performed to sub-pixel and/or sub-resolution accuracy. Therefore, localization of the defect is sub-pixel and/or sub-resolution.

In another embodiment, the determined location of the defect is a location in multiple dimensions, and the distance is determined in the multiple dimensions. For example, the embodiments described herein are inherently two-dimensional (2D) in that the embodiments can inherently determine the distances in multiple dimensions.

The computer subsystem(s) are also configured for determining a distance between the determined location of the defect and a known location of interest on the specimen. The known location of interest may be a location where a DOI is known or suspected to occur on the specimen. For example, as shown in step 314 of FIG. 3, the computer subsystem(s) may be configured for determining a distance between the determined location and an expected DOI location. In this manner, when an inspection is being performed, the distance(s) between the measured location and expected DOI location(s) on the specimen can be assigned to each candidate defect signal. Since the localization can be, as described above, sub-pixel, the embodiments described herein determine a distance between the measured and expected location(s) independent of the pixilation of the images. Other currently used methods are pixel-based. For example, other currently used methods choose (whole) pixels that are to be included in the detection area. Thus, these other methods are not sub-pixel, and they also depend on the pixilation of the measured image. The distance between the determined location of the defect and a known location of interest may otherwise be determined in any suitable manner. Since the determined location of the defect can be, as described above, determined in multiple dimensions, the distance between the determined location of the defect and the known location of interest can also be determined in multiple dimensions (e.g., in both x and y).

The computer subsystem(s) are further configured for determining if the defect is a DOI or a nuisance based on the determined distance. For example, as shown in step 316 of FIG. 3, the computer subsystem(s) may be configured for determining if a defect is a DOI or nuisance based on the determined distance. In one embodiment, determining if the defect is the DOI or the nuisance includes applying a threshold to the determined distance, determining that the defect is the DOI if the determined distance is below the threshold, and determining that the defect is the nuisance if the determined distance is greater than the threshold. In this manner, a distance threshold (or thresholds) can be set to maximize DOI capture rate while minimizing nuisance. For example, a distance threshold can be set, and events that are too far from the expected locations can be classified as nuisances. As such, the embodiments described herein can identify defects that are detected at locations determined to be within a preset distance of a known location of interest as DOIs while determining that defects detected at locations farther than the preset distance from a known location of interest are nuisances. The threshold may be determined in any suitable manner (e.g., empirically, experimentally, etc.).

In another embodiment, the determined location of the defect is a location in multiple dimensions, the distance is determined in the multiple dimensions, and determining if the defect is the DOI or the nuisance includes applying a threshold to each of the multiple dimensions. For example, the distance in x and y between the measured defect location and the expected DOI location(s) can be assigned to each candidate defect signal. In addition, different thresholds may be applied to each of the distances determined in each of the dimensions. In particular, a threshold for the distance in the x direction may be applied to the determined distance in the x direction, and a different threshold for the distance in the y direction may be applied to the determined distance in the y direction. In this manner, the threshold(s) that are applied to the determined distance may be a multi-dimensional threshold. The threshold(s) may be otherwise configured as described herein.

In one embodiment, the area on the specimen includes one of multiple regions of interest (ROIs) on the specimen. In another embodiment, the area on the specimen includes a ROI that has a sub-pixel and/or sub-resolution area. For example, the embodiments described herein enable forming an unlimited number of sub-pixel and/or sub-resolution ROIs. In one such example, each of the ROIs may be determined based on a known location of interest. In this manner, each of the ROIs may correspond to a different known location of interest. As described further herein, defect signals originating from outside these regions can be eliminated as not corresponding to the defect type of interest, greatly reducing nuisance and increasing sensitivity.

In this manner, one or more of the multiple ROI may be determined based on information about where the DOI are supposed to be. For example, when depositing silicon germanium (SiGe) on P-type metal-oxide-semiconductor (PMOS) fins, sometimes there may be missing material. Therefore, it may be known in advance that one or more of the areas of interest are at the PMOS locations where SiGe may be missing. However, other times, it may not be known where to expect the DOI to be.

In some embodiments, the area on the specimen is selected while the inspection subsystem generates the output, and the one or more computer subsystems detect defects on the specimen based on the output. For example, in contrast to currently used methods such as design-based care area (CA) methods and patch to design alignment (PDA) methods described further herein, the locations of interest in the output (e.g., optical images) may be determined on the fly. In particular, some of the currently used methods described herein set up relatively small CAs, i.e., regions that are inspected. There is a limit to the number of these regions that can be defined (e.g., due to the data handling capability of the system and/or the throughput requirements for inspection). In contrast, in the embodiments described herein, there may not be any limit on the number of inspection areas. Instead, the embodiments can go through the collected output and determine whether or not each potential defect is coming from the "correct" location. Therefore, there is no limit to the number of locations on a specimen that can be interrogated. As such, the embodiments described herein can perform the step(s) described herein for an unlimited number of expected locations.

In a further embodiment, the one or more computer subsystems are further configured to correlate the output of the inspection subsystem for the defect to output generated for the area on the specimen by a different output acquisition subsystem. For example, the embodiments described herein can be particularly useful for SEM-patch image correlation. In one such example, the embodiments described herein provide a substantially accurate way to compare defect locations between SEM images and optical images, allowing an accurate (or substantially accurate) determination of whether the signals in optical images come from the same location as defects seen in the SEM images. For example, the defect locations are determined as described further herein with respect to patterned features in the simulated output (and therefore on the specimen and/or in the design for the specimen). Those defect locations can then be used to locate the same positions with respect to the patterned features within the output generated by a different output acquisition subsystem. In this manner, the output generated by one subsystem at a defect location can be correlated to the output generated by another subsystem at the same defect location with relatively high confidence.

There are a variety of uses for such correlation of output from different subsystems. For example, some defect examples may be found by electron beam based inspection (EBI). These defects may be confirmed with SEM review, but may not have been detected in optical inspection. Therefore, it may be desirable to tune the optical inspection to be sensitive to these defects by changing one or more of the parameters on the optical inspector used for inspection. However, often in the optical image of one of these DOI, there may a signal (or multiple signals) but it may be unclear if that signal (or signals) comes from the DOI or from something else. For example, the signals could be due to some other process variation that is not visible in the SEM image. Therefore, SEM-optical patch image correlation may be performed to determine whether or not the optical signal originates from the location of the known DOI. If the optical signal comes from the correct location, then it is probably due to the DOI, and the inspection parameters can be optimized accordingly to increase the signal. However, if the optical signal comes from a different location, then it would be disadvantageous to increase that signal. Therefore, without an accurate method for determining where the optical signals originate, a considerable amount of time may be wasted optimizing the inspection to detect noise.

Compared to the embodiments described herein, determination of whether an optical defect signal originates from the same location as a DOI seen in a SEM image is typically performed by comparing the images manually (by a user). However, SEM-patch correlation performed by comparing SEM and optical images manually is relatively slow, requires the time of a trained expert, and is limited to a few optical pixels in accuracy.

Although some step(s) are described herein as being performed for "a" defect, it is to be understood that the step(s) described herein may be performed for all, some, or a portion of the defects detected on a specimen. For example, steps 308, 310, 312, 314, and 316 shown in FIG. 3 may be performed by the computer subsystem(s) for each detected event (where a detected event may be defined as a potential defect detected on a specimen, but which may actually be determined to be a DOI or a nuisance as described herein).

In addition, when one or more step(s) are performed by the computer subsystem(s) for more than one defect on the specimen, the results of the one or more step(s) for more than one defect may be used in combination to perform one or more other step(s). For example, in an additional embodiment, the one or more computer subsystems are configured for performing the aligning and detecting for multiple instances of the area on the specimen thereby detecting multiple defects in the multiple instances of the area, performing determining the location for the multiple defects, combining the determined locations of the multiple defects, and altering one or more parameters of one or more steps performed by the one or more computer subsystems for the specimen based on the combined locations.

In one such example, the x and y distances determined for all of the events that are analyzed by the computer subsystem(s) as described herein may be used as attributes in tuning (e.g., classification based tuning) of a recipe. In addition, the locations determined for all of the detected events found within a particular type of pattern on the specimen may be displayed in a single image. For example, for SRAM defects, all the relative locations of these defects from the entire specimen may be plotted within a single SRAM cell. Such information may also be overlaid with information for the particular type of pattern such as an image of the particular type of pattern or the design for the particular type of pattern. In the case of the SRAM cell or another cell, such combined and displayed information may be referred to as a cell stack. Based on this combined information, sub-pixel areas of interest may be defined (e.g., by a user or by the computer subsystem(s)) and defect detection thresholds may be set differently for different regions (e.g., by a user or by the computer subsystem(s)). Thresholds can be set lower in areas where defects are expected or known to be and higher in nuisance areas. For example, if it is known that DOI occur near gate edges to the side of PMOS fins, the thresholds used for defect detection in those areas can be set relatively low (to ensure detection of as many of the DOI in those areas as possible). In contrast, if it is known that nuisances occur at the ends of PMOS fins on (or below) gates, the thresholds used for defect detection in those areas can be set relatively high (to ensure detection of as few nuisances as possible). As such, detection thresholds can be set for each area of interest individually.

In this manner, precise location of DOI (and nuisance) information is valuable for users for a variety of reasons. In addition, if the locations of the DOI can be determined from a classified lot result (i.e., an inspection result whose detected events have been classified into DOIs or nuisances using some ground-truth method such as defect review on a SEM or other similarly capable defect review tool), possibly unexpected spatial separations between the DOIs and nuisances can be discovered. That information can then be advantageously used to improve DOI capture and nuisance rejection. Furthermore, knowing where the DOI are located may be useful to users in of itself.

Each of the embodiments of the system may be further configured according to any other embodiment(s) described herein.

Another embodiment relates to a computer-implemented method for determining if a defect detected on a specimen is a DOI or a nuisance. The method includes steps for each of the functions of the computer subsystem(s) described above. The inspection subsystem is configured as described herein.

Each of the steps of the method may be performed as described further herein. The method may also include any other step(s) that can be performed by the inspection subsystem and/or computer subsystem(s) or system(s) described herein. The steps of the method are performed by one or more computer systems, which may be configured according to any of the embodiments described herein. In addition, the method described above may be performed by any of the system embodiments described herein.

Figure 4:
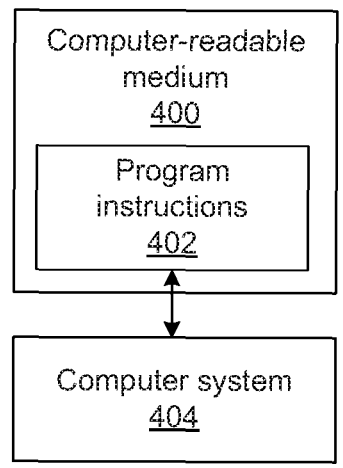
FIG. 4 is a block diagram illustrating one embodiment of a non-transitory computer-readable medium storing program instructions executable on a computer system for performing one or more of the computer-implemented methods described herein.

An additional embodiment relates to a non-transitory computer-readable medium storing program instructions executable on a computer system for performing a computer-implemented method for determining if a defect detected on a specimen is a DOI or a nuisance. One such embodiment is shown in FIG. 4. In particular, as shown in FIG. 4, non-transitory computer-readable medium 400 includes program instructions 402 executable on computer system 404. The computer-implemented method may include any step(s) of any method(s) described herein.

Program instructions 402 implementing methods such as those described herein may be stored on computer-readable medium 400. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 404 may be configured according to any of the embodiments described herein.

All of the methods described herein may include storing results of one or more steps of the method embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

Further modifications and alternative embodiments of various aspects of the invention will be apparent to those skilled in the art in view of this description. For example, methods and systems for determining if a defect detected on a specimen is a DOI or a nuisance are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to determine if a defect detected on a specimen is a defect of interest or a nuisance, comprising:
    an inspection subsystem comprising at least an energy source and a detector, wherein the energy source is configured to generate energy that is directed to a specimen, and wherein the detector is configured to detect energy from the specimen and to generate output responsive to the detected energy; and
    one or more computer subsystems configured for:
        aligning the output of the inspection subsystem for an area on the specimen to simulated output of the inspection subsystem for the area on the specimen;
        detecting a defect in the output for the area on the specimen;
        determining a location of the defect in the output with respect to patterned features in the simulated output based on results of said detecting and said aligning;
        determining a distance between the determined location of the defect and a known location of interest on the specimen; and
        determining if the defect is a defect of interest or a nuisance based on the determined distance, wherein determining if the defect is the defect of interest or the nuisance comprises applying a threshold to the determined distance, determining that the defect is the defect of interest if the determined distance is below the threshold, and determining that the defect is the nuisance if the determined distance is greater than the threshold.

2. The system of claim 1, wherein the known location of interest comprises a known location of a defect of interest.

3. The system of claim 1, wherein the one or more computer subsystems are further configured for generating different models of the specimen for different areas on the specimen and generating the simulated output for the area by selecting one of the different models corresponding to the area and simulating how the area would appear in the output generated by the inspection subsystem for the area based on the selected one of the different models.

4. The system of claim 1, wherein said aligning comprises performing multiple alignment steps in which the output for the area is separately aligned to multiple simulated outputs for the area, determining which of the multiple alignment steps produced the best alignment, and selecting results of the multiple alignment step determined to produce the best alignment as the results of the aligning used for determining the location of the defect.

5. The system of claim 1, wherein said aligning comprises maximizing a cross-correlation between the output and the simulated output.

6. The system of claim 1, wherein said aligning aligns the output to the simulated output with sub-pixel accuracy.

7. The system of claim 1, wherein said aligning aligns the output to the simulated output with sub-resolution accuracy.

8. The system of claim 1, wherein the output used for said aligning comprises a reference image for the area, wherein the output for the area further comprises a target image, and wherein the one or more computer subsystems are further configured for aligning the target image for the area to the reference image thereby aligning the target image to the simulated output.

9. The system of claim 1, wherein the output for the area comprises reference output and target output for the area, wherein detecting the defect comprises generating a difference image for the area by subtracting the reference output for the area from the target output for the area and detecting the defect in the difference image by applying ante threshold to the difference image, and wherein the other threshold is a hot threshold.

10. The system of claim 1, wherein the output for the area comprises reference output and target output for the area, wherein detecting the defect comprises generating a difference image for the area by subtracting the reference output for the area from the target output for the area and applying a defect detection method to the difference image, and wherein determining the location of the defect is performed by fitting a portion of the difference image corresponding to the defect to a Gaussian function.

11. The system of claim 1, wherein the output for the area comprises reference output and target output for the area, wherein detecting the defect comprises generating a difference image for the area by subtracting the reference output for the area from the target output for the area and applying a defect detection method to the difference image, and wherein determining the location of the defect is performed by fitting a portion of the difference image corresponding to the defect to a function.

12. The system of claim 1, wherein the output for the area comprises reference output and target output for the area, wherein detecting the defect comprises generating a difference image for the area by subtracting the reference output for the area from the target output for the area and applying a defect detection method to the difference image, and wherein determining the location of the defect is performed by fitting a portion of the difference image corresponding to the defect to an Airy disc function.

13. The system of claim 1, wherein the output for the area comprises reference output and target output for the area, wherein detecting the defect comprises generating a difference image for the area by subtracting the reference output for the area from the target output for the area and applying a defect detection method to the difference image, and wherein determining the location of the defect is performed by determining a centroid of the defect in the difference image.

14. The system of claim 1, wherein the output for the area comprises reference output and target output for the area, wherein detecting the defect comprises generating a difference image for the area by subtracting the reference output for the area from the target output for the area and applying a defect detection method to the difference image, and wherein determining the location of the defect comprises shifting a simulated image of a profile of the defect relative to the difference image until a cross-correlation between the simulated image of the profile of the defect and the difference image is maximized.

15. The system of claim 1, wherein the output for the area comprises reference output and target output for the area, wherein detecting the defect comprises generating a difference image for the area by subtracting the reference output for the area from the target output for the area and applying a defect detection method to the difference image, and wherein determining the location of the defect comprises shifting a simulated image of a profile of the defect relative to the difference image until a sum-squared difference between the simulated image of the profile of the defect and the difference image is minimized.

16. The system of claim 1, wherein the output for the area comprises reference output and target output for the area, wherein detecting the defect comprises generating a difference image for the area by subtracting the reference output for the area from the target output for the area and applying a defect detection method to the difference image, and where determining the location of the defect comprises performing interpolation to upsample the difference image onto a grid of pixels that is finer than a grid of pixels in the output and using location of a center of a pixel in the finer grid of pixels with the strongest signal as the location of the defect.

17. The system of claim 1, wherein the location of the defect with respect to the patterned features is determined with sub-pixel accuracy.

18. The system of claim 1, wherein the location of the defect with respect to the patterned features is determined with sub-resolution accuracy.

19. The system of claim 1, wherein the determined location of the defect is a location in multiple dimensions, wherein the distance is determined in the multiple dimensions, and wherein determining if the defect is the defect of interest or the nuisance further comprises applying the threshold or another threshold to each of the multiple dimensions.

20. The system of claim 1, wherein the area on the specimen comprises a region of interest on the specimen that has a sub-pixel area.

21. The system of claim 1, wherein the area on the specimen comprises a region of interest on the specimen that has a sub-resolution area.

22. The system of claim 1, wherein the area on the specimen is selected while the inspection subsystem generates the output and the one or more computer subsystems detect defects on the specimen based on the output.

23. The system of claim 1, wherein the one or more computer subsystems are further configured to correlate the output of the inspection subsystem for the defect to output generated for the area on the specimen by a different output acquisition subsystem.

24. The system of claim 1, wherein the specimen comprises a wafer.

25. The system of claim 1, wherein the specimen comprises a reticle.

26. The system of claim 1, wherein the energy directed to the specimen comprises light, and wherein the energy detected from the specimen comprises light.

27. The system of claim 1, wherein the energy directed to the specimen comprises electrons, and wherein the energy detected from the specimen comprises electrons.

28. The system of claim 1, wherein the one or more computer subsystems are further configured for performing said aligning and said detecting for multiple instances of the area on the specimen thereby detecting multiple defects in the multiple instances of the area, performing said determining the location for the multiple defects, combining the determined locations of the multiple defects, and altering one or more parameters of one or more steps performed by the one or more computer subsystems for the specimen based on the combined locations.

29. The system of claim 28, wherein the determined locations of the multiple defects comprise x and y locations determined for all of the multiple defects, and wherein said altering comprises tuning a recipe for the one or more steps using the x and y locations as attributes.

30. The system of claim 1, wherein the area on the specimen comprises one of multiple regions of interest on the specimen.

31. The system of claim 30, wherein each of the multiple regions of interest is determined based on the known location of interest or another known location of interest on the specimen.

32. The system of claim 30, wherein each of the multiple regions of interest corresponds to a different known location of interest on the specimen.

33. The system of claim 30, wherein each of the multiple regions of interest is determined based on the known location of interest or another known location of interest on the specimen, and wherein determining if the defect is the defect of interest or the nuisance further comprises determining if the defect is outside of the multiple regions of interest and eliminating the defect if it is determined to be outside of the multiple regions of interest as not corresponding to a defect type of interest.

34. The system of claim 30, wherein one or more of the multiple regions of interest are determined based on information about where defects of interest are supposed to be on the specimen.

35. The system of claim 30, wherein one or more of the multiple regions of interest are at P-type metal-oxide-semiconductor locations on the specimen where missing material occurs.

36. The system of claim 1, wherein the one or more computer subsystems are further configured for performing said aligning and said detecting for multiple instances of the area on the specimen thereby detecting multiple defects in the multiple instances of the area, performing said determining the location for the multiple defects, and displaying the locations determined for all of the multiple defects detected within a particular type of pattern on the specimen in a single image.

37. The system of claim 36, wherein the particular type of pattern on the specimen comprises a static random access memory cell.

38. The system of claim 36, wherein the one or more computer subsystems are further configured for overlaying the single image with information for the particular type of pattern.

39. The system of claim 38, wherein the information for the particular type of pattern comprises an image of the particular type of pattern or design for the particular type of pattern.

40. The system of claim 36, wherein the one or more computer subsystems are further configured for defining sub-pixel areas of interest based on the single image and setting defect detection thresholds differently for different sub-pixel areas of interest.

41. The system of claim 40, wherein the defect detection thresholds are set lower in the sub-pixel areas of interest where defects are expected or known to be and higher in the sub-pixel areas of interest that are nuisance areas.

42. The system of claim 41, wherein the sub-pixel areas of interest where the defects are expected or known to be comprise gate edges to a side of P-type metal-oxide-semiconductor fins.

43. The system of claim 41, wherein the sub-pixel areas of interest that are the nuisance areas comprise ends of P-type metal-oxide-semiconductor fins on or below gates.

44. A non-transitory computer-readable medium, storing program instructions executable on a computer system for performing a computer-implemented method for determining if a defect detected on a specimen is a defect of interest or a nuisance, wherein the computer-implemented method comprises:
    aligning output of an inspection subsystem for an area on a specimen to simulated output of the inspection subsystem for the area on the specimen, wherein the inspection subsystem comprises at least an energy source and a detector, wherein the energy source is configured to generate energy that is directed to the specimen, and wherein the detector is configured to detect energy from the specimen and to generate the output responsive to the detected energy;
    detecting a defect in the output for the area on the specimen;
    determining a location of the defect in the output with respect to patterned features in the simulated output based on results of said detecting and said aligning;
    determining a distance between the determined location of the defect and a known location of interest on the specimen; and
    determining if the defect is a defect of interest or a nuisance based on the determined distance, wherein determining if the defect is the defect of interest or the nuisance comprises applying a threshold to the determined distance, determining that the defect is the defect of interest if the determined distance is below the threshold, and determining that the defect is the nuisance if the determined distance is greater than the threshold, and wherein aligning the output, detecting the defect, determining the location, determining the distance, and determining if the defect is a defect of interest or a nuisance are performed by one or more computer subsystems.

45. A computer-implemented method for determining if a defect detected on a specimen is a defect of interest or a nuisance, comprising:
    aligning output of an inspection subsystem for an area on a specimen to simulated output of the inspection subsystem for the area on the specimen, wherein the inspection subsystem comprises at least an energy source and a detector, wherein the energy source is configured to generate energy that is directed to the specimen, and wherein the detector is configured to detect energy from the specimen and to generate the output responsive to the detected energy;
    detecting a defect in the output for the area on the specimen;
    determining a location of the defect in the output with respect to patterned features in the simulated output based on results of said detecting and said aligning;
    determining a distance between the determined location of the defect and a known location of interest on the specimen; and
    determining if the defect is a defect of interest or a nuisance based on the determined distance, wherein determining if the defect is the defect of interest or the nuisance comprises applying a threshold to the determined distance, determining that the defect is the defect of interest if the determined distance is below the threshold, and determining that the defect is the nuisance if the determined distance is greater than the threshold, and wherein aligning the output, detecting the defect, determining the location, determining the distance, and determining if the defect is a defect of interest or a nuisance are performed by one or more computer subsystems.

* * * * *